United States Patent [19]

Aihara

[11] Patent Number: 4,982,217
[45] Date of Patent: Jan. 1, 1991

[54] CAMERA WITH AUTOMATIC FOCUSING APPARATUS

[75] Inventor: Yoshihiko Aihara, Yokohama, Japan

[73] Assignee: Canon Kabushiki Kaisha, Tokyo, Japan

[21] Appl. No.: 455,781

[22] Filed: Jan. 2, 1990

Related U.S. Application Data

[63] Continuation of Ser. No. 412,609, Sep. 27, 1989, abandoned, which is a continuation of Ser. No. 333,807, Apr. 6, 1989, abandoned, which is a continuation of Ser. No. 143,031, Jan. 12, 1988, abandoned.

[30] Foreign Application Priority Data

| Jan. 12, 1987 | [JP] | Japan | 62-003136 |
| Jan. 12, 1987 | [JP] | Japan | 62-003137 |
| Jan. 12, 1987 | [JP] | Japan | 62-003138 |
| Jan. 12, 1987 | [JP] | Japan | 62-003139 |
| Jan. 12, 1987 | [JP] | Japan | 62-003140 |
| Jan. 12, 1987 | [JP] | Japan | 62-003141 |
| Jan. 12, 1987 | [JP] | Japan | 62-003142 |
| Jan. 12, 1987 | [JP] | Japan | 62-003144 |

[51] Int. Cl.$^5$ ............................................. G03B 13/36
[52] U.S. Cl. ................................. 354/400; 354/403; 354/408
[58] Field of Search .............. 354/400, 402, 403, 409, 354/195.1, 195.11

[56] References Cited

U.S. PATENT DOCUMENTS

| 4,274,725 | 6/1981 | Gross . | |
| 4,341,447 | 7/1982 | Biber ................................. | 354/408 |
| 4,362,372 | 12/1982 | Kiesel . | |
| 4,609,274 | 9/1986 | Iwashita et al. ..................... | 354/400 |
| 4,614,418 | 9/1986 | Ishizaki et al. ...................... | 354/408 |
| 4,639,110 | 7/1987 | Rinn et al. .......................... | 354/403 |

*Primary Examiner*—Russell E. Adams
*Attorney, Agent, or Firm*—Fitzpatrick, Cella, Harper & Scinto

[57] ABSTRACT

An automatic focusing apparatus for a camera includes. The automatic focusing apparatus operated to drive a photographing lens to an in-focus position for an object upon a first operation of an operation member and to an in-focus position for another object upon a second operation of the operation member. Upon a third operation of the operation member, the lens is automatically driven to an intermediate position between the first and second positions, thereby simplifying lens driving for obtaining an in-focus state for the objects located at the different positions.

23 Claims, 5 Drawing Sheets

CAMERA WITH AUTOMATIC FOCUSING APPARATUS

This application is a continuation of application Ser. No. 412,609 filed Sept. 27, 1989, now abandoned, which is a continuation of application Ser. No. 333,807 filed Apr. 6, 1989, now abandoned, which is a continuation of application Ser. No. 143,031 filed Jan. 12, 1988, now abandoned.

BACKGROUND OF THE INVENTION

1. Field of the Invention

The present invention relates to a camera with an automatic focusing apparatus.

2. Related Background Art

In a conventional automatic focusing (AF) camera, in order to photograph objects in an in-focus state, stopped-down-aperture metering is performed to determine an f-number (i.e., exposure value) for covering all the objects in accordance with field brightness while the states of the objects are checked.

Photographing under these circumstances depends on the experiences of the user and is not suitable for a beginner, and often results in over or under exposure.

In a conventional camera disclosed in U.S. Pat. No. 4,219,261, a distance ring is manually turned to adjust lens positions respectively corresponding to the in-focus states of different objects, and a specific position between the in-focus positions is calculated. The distance ring is manually turned to set the lens position to the specific position, and the lens can be set in the in-focus state for objects at different positions.

In the camera disclosed in U.S. Pat. No. 4,219,261, all operations are manual operations, complicated, and time-consuming. The user often misses the shutter chance.

In order to solve the above problem, the present applicant filed a U.S. patent application on Sept. 28, 1987, disclosing an automatic focusing camera in which a lens can be moved to an intermediate position of the in-focus positions of two objects located at different positions.

SUMMARY OF THE INVENTION

One aspect of the invention is to improve operability of the camera disclosed in the above U.S. application and to provide a camera with an automatic focusing apparatus wherein the automatic focusing apparatus drives the lens to a first position where the lens is set in the in-focus position for a first object upon a first operation of an operation member, the automatic focusing apparatus drives the lens from the first position to a second position where the lens is set in the in-focus position for a second object upon a second operation of the operating member, and the automatic focusing apparatus automatically drives the lens to an intermediate position between the first and second positions upon a third operation of the operation member.

Based on the above aspect, another aspect of the invention is to provide a camera capable of calculating photometric values obtained when the lens is driven to the in-focus positions for the objects upon the first and second operations of the operation member, and of performing exposure control on the basis of the photometric values.

Based on the above aspects, still another aspect of the invention is to provide a camera capable of performing exposure control based on a photometric output obtained when the lens is moved to the intermediate position upon the third operation.

Based on the above aspects, still another aspect of the invention is to provide a camera capable of inhibiting a release operation despite the actuation of a release operation member upon the first operation of the operation member until the lens is moved to the intermediate position upon the third operation of the operation member.

Based on the above aspects, still another aspect of the invention is to provide a camera capable of repeating a photographing cycle after lens control for the first photographing cycle is performed and then the lens position set in the first photographing cycle is kept unchanged in the subsequent photographing cycles.

Based on the above aspects, still another aspect of the invention is to provide a camera capable of inhibiting movement of the lens to the intermediate position when a flash unit is ready for flashing while the lens is being driven to the intermediate position by the operation member.

Based on the above aspects, still another aspect of the invention is to provide a camera capable of setting automatic focusing in a one-shot mode when the lens is driven by the operation member even if the automatic focusing apparatus is set in a servo mode.

The above and other aspects, features, and advantages of the present invention will be apparent from a detailed description of a preferred embodiment in conjunction with the accompanying drawings.

DESCRIPTION OF THE PREFERRED EMBODIMENT

Figure 1A:
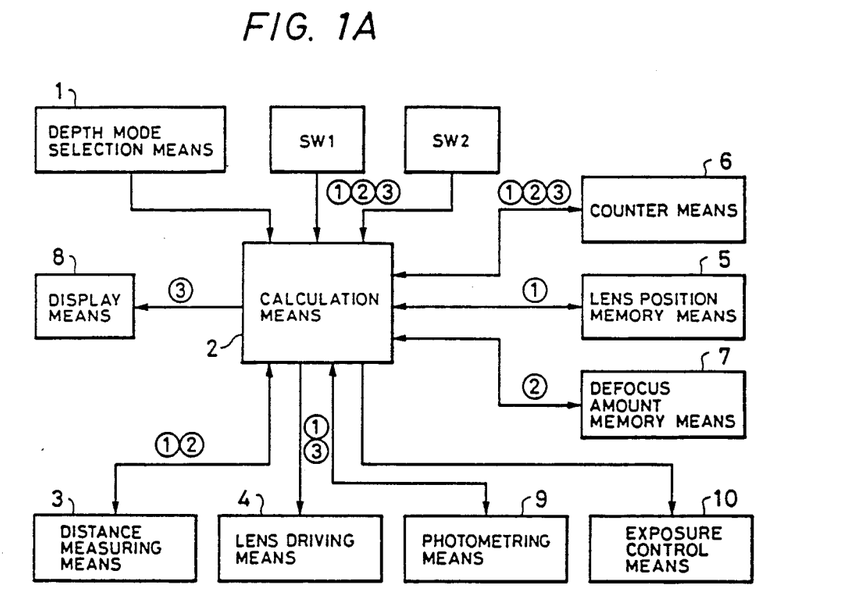
FIG. 1A is a block diagram showing a basic arrangement of a camera with an automatic focusing apparatus according to an embodiment of the present invention.
Figure 1B:
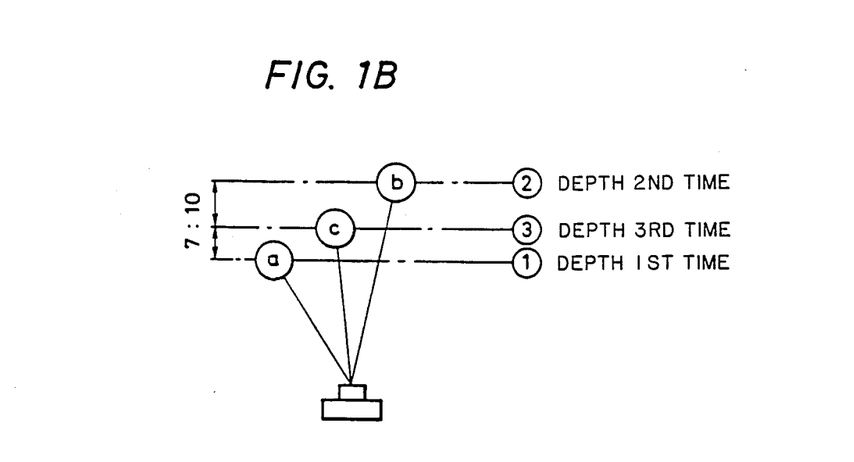
FIG. 1B is a view showing an operation sequence of the ca shown in FIG. 1A.

FIG. 1A is a block diagram showing a basic arrangement of a camera with an automatic focusing apparatus according to an embodiment of the present invention, and FIG. 1B is a view showing an operation sequence in the camera in FIG. 1A.

A depth mode selection means 1 serves as a means for selecting a depth-of-field priority photographing (to be referred to as a depth hereinafter) mode. The depth mode is selected when a user wishes to take a picture of a plurality of objects located at different positions in an in-focus state.

When the user selects the depth mode, the user selects a near object a as an object subjected to distance measurement. The user then depresses a shutter button (not shown) with a first stroke to turn on a photometering switch sw1 (corresponding to an operating means of the present invention), thereby performing the first depth operation. A calculation means 2 causes a distance measuring means 3 to measure a distance to the near object a and to obtain an in-focus position of the object a. A lens driving means 4 drives a photographing lens attached to the camera to the in-focus position. The resultant lens position is stored in a lens position memory means 5 and a counter means 6 counts the first depth operation.

The user then turns off the photometering switch sw1 and selects a far object b as an object subjected to distance measurement. The user turns on the photometering switch sw1 again to perform the second depth operation. The calculation means 2 causes the distance measuring means 3 to measure a distance to the far object b. A defocus amount on the image plane is obtained and is stored in a defocus amount memory means 7. The counter means 6 counts the second depth operation.

The user then turns off the photometering switch sw1 and observes' the near and far objects a and b through a viewfinder. The user turns on the photometering switch sw1 again to perform the third depth operation. The calculation means 2 reads out the defocus amount from the defocus amount memory means 7 and internally divides the lens moving distance corresponding to the readout defocus amount with a predetermined ratio, e.g., 7:10 to calculate an intermediate position c. The lens driving means 4 drives the photographing lens to the intermediate position c. At the same time, 7/17 of the defocus amount, that is, the defocus amount at the intermediate position c, is divided by a diameter of 35 μm of a circle of least confusion to calculate an aperture value which allows the near and far objects a and b to fall within the depth of field. The aperture value or f-number is displayed on a display means 8. The counter means 6 counts the third depth operation. By the first to third operations of the photometering switch sw1, the aperture value depending on the depth is completed. ①, ②, and ③ in FIG. 1A represent steps in the first to third depth operations.

The calculation means 2 may receive a photometric value from a photometering means 9 or a photometric value obtained in the third depth operation. The calculation means 2 calculates a shutter speed or time value in accordance with the photometric information from the photometering means 9 in the third depth operation and the calculated aperture value or f-number. The shutter speed and the f-number are displayed on the display means 8.

When the user turns on a release switch sw2 simultaneously or after the third depth operation is performed, the calculation means 2 outputs the f-number and the shutter speed to an exposure control means 1, and the exposure control means 1 starts exposure operation. Therefore, the user can take a picture in a state wherein all objects between the near and far objects a and b are kept in the in-focus states.

According to this embodiment, the f-number is calculated by the defocus amount such that both the near object a and the far object b can fall within the depth of field. The f-number for assuring the in-focus state of a plurality of objects can be automatically determined. The processing for the in-focus positions of the near and far objects a and b and the intermediate position c between them is performed in accordance with the first to third operations of the photometering switch sw1. Therefore, the operation sequence is very simple and can be easily performed by the user.

In the embodiment described with reference to FIGS. 1A and 1B, the lens is not driven in the second depth operation. However, the photographing lens may be driven even in the second lens operation In this case, the user can clearly recognize that the objects are set in the in-focus positions in the first and second depth operations, thereby clarifying the operation procedures.

The far object b may be subjected to distance measurement in the first depth operation, and the near object a may be subjected to distance measurement in the second depth operation.

The predetermined ratio for internally dividing the defocus amount is not limited to 7:10, but may be, e.g., 1:1. In order to calculate the aperture value, the defocus amount at the intermediate position c is divided by the diameter of the circle of least confusion. However, the aperture value may be converted on the basis of the table representing the relationship between the defocus amounts and the aperture values.

The operating means in FIG. 1(A) comprises the photometering switch sw1 which is turned on with the first stroke of the shutter button. However, a separate photometering switch may be used, or a depth operating means may be arranged.

Figure 2:
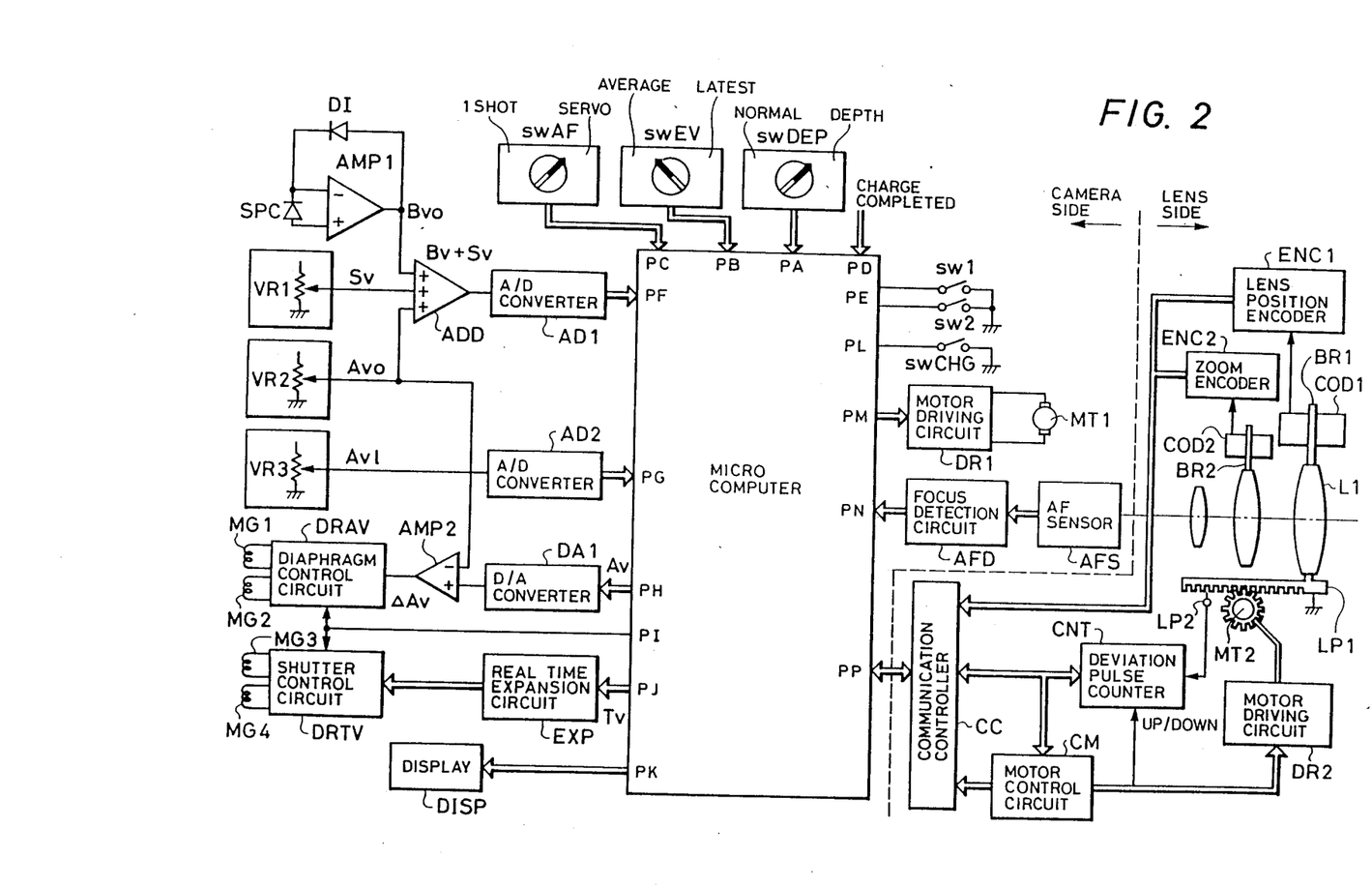
FIG. 2 is a block diagram showing a detailed arrangement the shown in FIG. 1A.

The detailed arrangement of the camera shown in FIG. 1A will be described with reference to FIG. 2.

In the camera, a TTL full-aperture photometric light-receiving element SPC, a logarithmic compression diode DI, and an operational amplifier AMP1 constitute a photometering means. The photometering means outputs a brightness value (the APEX value) corresponding to a full-aperture photometric operation Bv0. A sensitivity value setting variable resistor VR1 outputs a sensitivity value Sv (the APEX value) or a film speed. A full-aperture setting variable resistor VR2 sets an aperture value Av0 (the APEX value) or f-number corresponding to the full-aperture state of the lens attached to the camera. A smallest aperture value setting variable resistor VR3 sets a minimum aperture value Av1 (the fully closed aperture or diaphragm in the stopped-down side) of the lens attached to the camera. The camera also includes an adder ADD for calculating an exposure value Ev=Bv0+Sv+Av0=Bv+Sv, A/D converters AD1 and AD2, a D/A converter for converting the aperture value Av output from the PH port of a microcomputer COM into an analog voltage, and a subtracter AMP2 for calculating an aperture value difference ΔAv=Av−Av0. A diaphragm control circuit DRAV includes diaphragm control start magnet MG1 and a diaphragm control end magnet MG2 and controls the diaphragm on the basis of the aperture value difference ΔAv. A real time expansion circuit EXP real-time expands the time value Tv output from the PJ portion of the microcomputer COM. A shutter control circuit DRTV includes a front curtain magnet MG3 and a rear curtain magnet MG4 and controls driving of the front and rear curtains on the basis of the time value output from the real time expansion circuit EXP. A display DISP displays the f-number corresponding to the aperture value, a shutter speed corresponding to the time value, and the first and second depth operations. The microcomputer COM includes the PA to PP ports.

An AF (Automatic Focusing) mode selection switch swAF selects a one-shot AF mode or a servo AF mode. A photometric value selection switch swEV selects an average exposure value in the first and second depth operations, or a latest value of the third depth operation. A depth mode selection switch swDEP selects a depth mode or a normal mode. The photometering switch sw1 is turned on with the first stroke of the shutter button. The photometering switch sw2 is turned on with the second stroke of the shutter button. A charge switch swCHG is turned on when the shutter charge operation is completed and turned off when the rear curtain finishes traveling. A charge motor MT1 drives a charging mechanism for the shutter and the like and a film winding mechanism. A motor driving circuit DRI electrifies the charge motor MT1. The light-receiving element AFS serves as an AF sensor for receiving an object image incident through a photographing lens L1. A focus detection circuit AFD calculates a defocus amount d between the image plane and the in-focus position on the basis of a signal from the AF sensor AFS.

The above elements excluding the photographing lens L1 are included in the camera side. Elements to be described below are arranged in the lens side and communicate with the camera side through a communication controller CC arranged in the lens.

A brush BR1 is interlocked with the photographing lens L1. A code pattern plate COD1 cooperates with the brush BR1 to detect a position (distance ring position) on the photographing lens L1. A lens position encoder ENC1 encodes the lens position into a digital signal. A brush BR2 is interlocked with changes in focal distance (length) upon zooming. A code pattern plate COD2 cooperates with the brush BR2 to detect the focal length. A zoom encoder ENC2 encodes the focal length into a digital signal.

A motor control circuit CM controls the motor driving circuit DR2 on the basis of a lens driving amount signal and a lens driving direction signal, both of which are input from the PP port of the microcomputer COM through the communication controller CC and determines an up or down mode of a deviation pulse counter CNT. A lens driving motor MT2 is electrified and driven by the motor driving circuit DR2 in a lens driving direction to drive the photographing lens L1 along its optical axis. A saw-toothed pattern LP1 is interlocked with movement of the photographing lens L1. A contact piece LP2 is brought into contact with the saw-toothed pattern LP1 and sends a deviation pulse upon every unit displacement of the photographing lens L1. A deviation pulse counter CNT is reset in response to the lens driving amount signal input from the communication controller CC, counts deviation pulses input from the contact piece LP2, and sends a stop instruction for the lens driving motor MT2 to the motor control circuit CM.

Figure 3A:
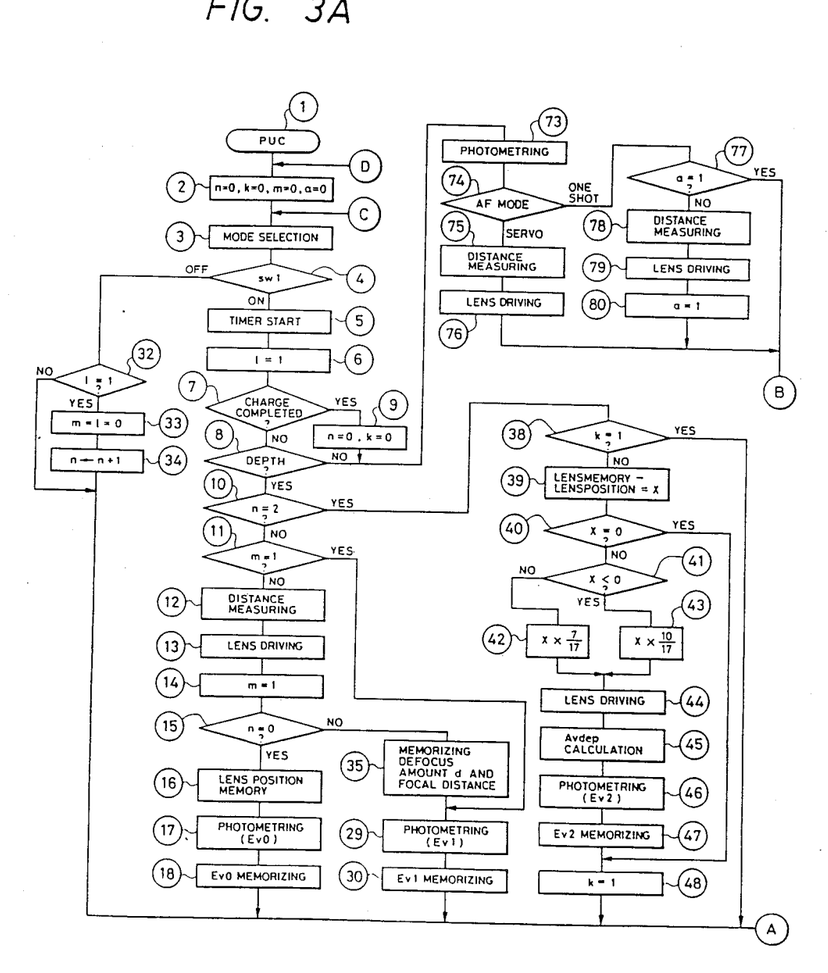
FIGS. 3A, 3B and 4 are flow charts for explaining the operations of a microcomputer shown in FIG. 2.
Figure 3B:
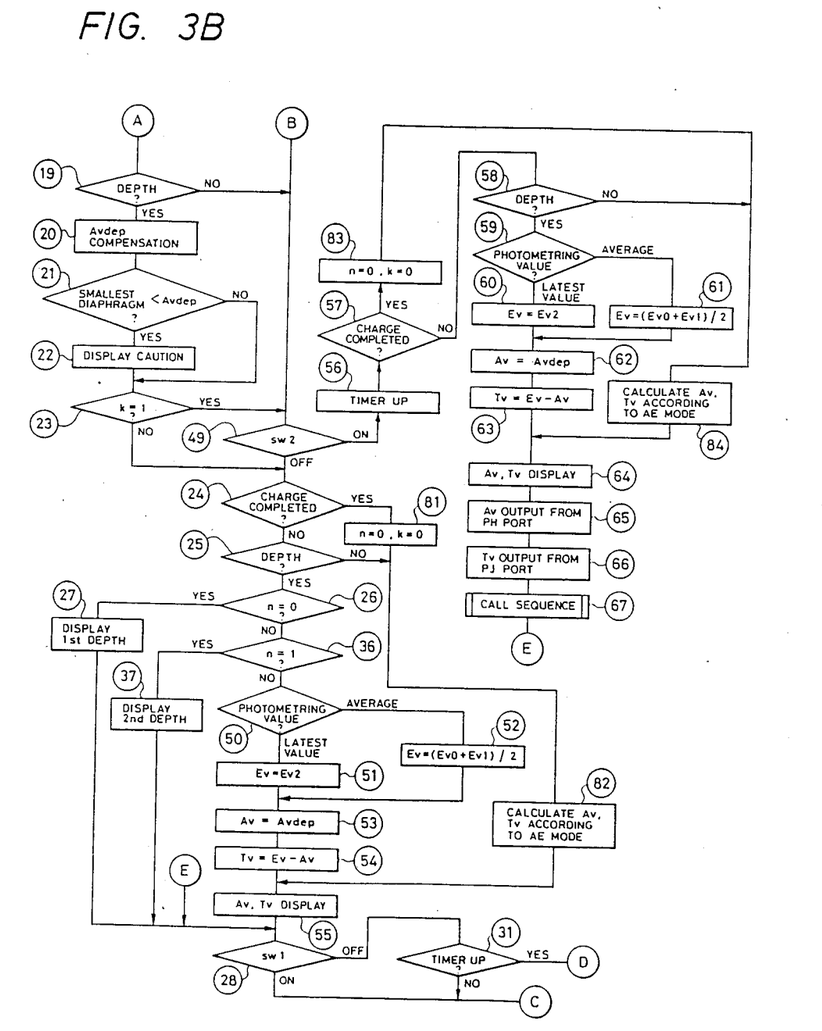

The operations of the microcomputer COM will be described with reference to the flow charts in FIGS. 3A, 3B and 4.

(Step 1)
Power is supplied from a power source (not shown) upon operation of a power switch, and the power-up-clear (PUC) operation is performed.

(Step 2)
An n register representing a depth operation count (i.e., the number of times of depression of the photometering switch sw1), a K register representing whether the aperture value is determined by the depth operation, a m register representing whether lens driving in the depth mode is completed, and an a register representing whether distance measurement and lens driving in the one-shot mode are completed are reset to zero.

(Step 3)
The user selects a desired mode. For example, the user operates the depth mode selection switch swDEP to select the depth mode and depresses the photometering switch sw1 once so as to select the first object as the object subjected to distance measurement.

(Step 4)
The state of the photometering switch sw1 is detected. Since the photometering switch sw1 is ON, the flow advances to step 5.

(Step 5)
The timer is started. The timer is used to measure a predetermined period of time (e.g., 8 seconds) for maintaining the aperture value determined by the depth operation after the photometering switch sw1 is turned off.

(Step 6)
The l register representing that the photometering switch sw1 is turned on is set at logic "1".

(Step 7)
The microcomputer COM checks if a charge end signal from a strobe unit attached to the camera is input to the PD port. If NO in step 7, the flow advances to step 8. Otherwise, the flow is branched into step 9. The routine in step 9 will be described later.

(Step 8)
The microcomputer COM checks if the depth mode is set. Since the user sets the depth mode, the flow advances to step 10.

(Step 10)
The microcomputer COM checks how many depth operations are performed. Since only the first depth operation is performed, n=0 is set. The flow advances to step 11.

(Step 11)
The microcomputer COM checks the state of the m register representing whether the lens is driven in the depth mode. Since the lens is not driven, the flow advances to step 12.

(Step 12)
The focus detection circuit AFD is driven to fetch through the PN port the defocus amount d of the first object image incident on the AF sensor AFS through the photographing lens L1.

(Step 13)
The lens driving amount and the lens driving direction are calculated based on the defocus amount d obtained in step 12. The calculated results are output from the PP port. The lens driving amount is set in the deviation pulse counter CNT and the up or down mode is set in accordance with the lens driving direction. The motor control circuit CM determines the forward or reverse rotational direction of the lens driving motor MT2 in accordance with the lens driving direction. The motor control circuit CM operates the motor driving circuit DR2 and causes the lens driving motor MT2 to move the photographing lens L1 along the optical axis. Axial movement of the photographing lens L1 along the optical axis is converted into a deviation pulse by cooperation of the saw-toothed pattern LP1 and the contact piece LP2 and the deviation pulses are counted by the deviation pulse counter CNT. When the count of the deviation pulse counter CNT coincides with the preset lens driving amount, a coincidence signal is output from the displacement pulse counter CNT to the motor control circuit CM. The motor control circuit CM causes the motor driving circuit DR2 to stop driving the lens driving motor MT2. By the above operations, the photographing lens L1 is moved by the lens driving amount and reaches the in-focus position.

(Step 14)

Logic "1" is set in the m register. Condition m=1 indicates that lens driving has been completed.

(Step 15)

The microcomputer COM determines whether the n register is set at logic "0", i.e., whether the first depth operation is performed. Since YES is established in step 15, the flow advances to step 16.

(Step 16)

The lens position (i.e., the distance ring position) obtained by the first depth operation is stored in a memory incorporated in the microcomputer COM.

(Step 17)

exposure value Ev as an output from the A/D converter AD1 is fetched through the PF port.

(Step 18)

The exposure value as the photometric value fetched in step 17 is stored in the memory in the microcomputer COM.

(Step 19)

The microcomputer COM determines whether the depth mode is set.

(Step 20)

An aperture value Avdep derived from the depth operation is corrected in accordance with a change in focal length due to zooming. The depth operation is the first depth operation and the aperture value Avdep is not yet determined. No operation is performed in this step.

(Step 21)

The aperture value Avdep is compared with the minimum aperture value Av1 corresponding to the fully closed diaphragm. Since only the first depth operation is performed, the aperture Avdep is not yet determined and no operation is performed in this step.

(Step 22)

If the aperture value Avdep is smaller than the minimum aperture value Av1, the display DIPS is flickered as an alarm. No operation is performed in this step this time.

(Step 23)

The microcomputer COM determines whether the K register is set at logic "1" (i.e., whether the aperture value Avdep is determined). Since NO in step 23, the flow advances to step 24.

(Step 24)

The microcomputer COM determines whether a charge end signal is input from the strobe unit. If NO in step 24, the flow advances to step 25.

(Step 25)

The microcomputer COM determines whether the depth mode is set.

(Step 26)

The microcomputer COM determines whether the first depth operation (n=0) is performed. Since only the first depth operation is performed, the flow advances to step 27.

(Step 27)

A numeric value representing the first depth operation is displayed on the display DISP.

(Step 28)

If the photometering switch sw1 is kept on, the flow returns to step 3. The operations in steps 3 to 8 and 10 are performed. If the m register is set at logic "1" in step 11, i.e., the microcomputer COM determines that lens driving has already been performed, the flow advances to step 29.

(Step 29)

The microcomputer COM fetches the exposure value Ev as an output from the A/D converter AD1 through its PF port.

(Step 30)

The photometric output fetched in step 29 is stored in the memory as the exposure value Ev1. The operations in steps 19 to 28 are performed, and the flow returns to step 3. The above routine is repeated as far as the photometering switch sw1 is kept on. When the photometering switch sw1 is turned off, the flow is branched from step 28 to step 31.

(Step 31)

If the time set in the timer is not up even after the photometering switch sw1 is turned off, the flow returns to step 3. The flow is branched from step 4 to step 32.

(Step 32)

The microcomputer COM detects the state of the register. Since 1 =1 is established in step 6, the flow advances to step 33.

(Step 33)

The m and l registers are reset to logic "0".

(Step 34)

"1" is added to the n register and the count of the n register is 1. Condition n=1 indicates that the second depth operation is going to be performed next.

The operations in steps 19 to 26, and steps 36, 37, 28, 31, 3, 4, 32, and 19 are repeated during the OFF period of the switch sw1 while the time in the timer has not yet been elapsed. In the above processing, when the user turns on the photometering switch sw1 for the second time by selecting the second object as an object subjected to distance measurement, the flow advances from step 4 to step 5. The second depth operation is started. The same operations as in the first depth operation are performed up to step 14 in the second depth operation. The distance between the camera and the second object is measured in step 2. The photographing lens L1 is moved to the in-focus position in step 13. Since the second depth operation is indicated (n=1) in step 15, the flow advances to step 35.

(Step 35)

A defocus amount d detected by the distance measurement in the second depth operation and the corresponding focal length data input from the zoom encoder ENC2 are stored in the memory. The photometric operation is performed in steps 29 and 30, and the exposure value is updated to an exposure value Ev1. The flow advances to step 26 through steps 19 to 25 and then to step 36.

(Step 36)

The microcomputer COM determines whether the second depth operation is performed. Since YES in step 36, i.e., since the n=1 is set in step 34, the flow advances to step 37;

(Step 37)

A numeric value representing the second depth operation is displayed on the display DISP. The operations in steps 28, 3 to 11, 29, 30, 19 to 26, 36, 37, and 28 are repeated as long as the switch sw1 is kept on. When the photometric switch sw1 is turned off during the repetition of the above steps, a routine in steps 32 to 34 follows step 4. In this routine, "0"s are set in the m and l registers, and the count of the n register is updated to n+1, i.e., 2. The microcomputer COM waits for the third ON operation of the photometering switch sw1. If the switch sw1 is kept off, the operations in steps 19 to 26, 36, 50, 51 or 52, 53, 55, 28, 31, 3, 4, and 32 follow step 34. A series of operations in steps 19 to 32 are repeated.

During this processing, when the user pans the camera to set the first and second objects within the frame and turns on the photometering switch sw1 for the third time, the third depth operation is started. The operations in the third depth operation are the same as those in the first and second depth operations up to step 8. The flow is branched from step 10 to step 38. Since n=2 is established, the flow advances from step 10 to step 38.

(Step 38)

The microcomputer COM detects the state of the K register. Since the aperture value Avdep is not determined, i.e., K=0, the flow advances to step 39.

(Step 39)

The lens position obtained in the first depth operation and stored in step 16 is read out in this step, and a difference X between the present lens position and the in-focus position obtained in the second depth operation is calculated. Note that the present lens position is input to the PP port of the microcomputer COM through the encoder ENC1.

(Step 40)

Any aperture value can be taken if X=0, i.e., if the in-focus position obtained in the first depth operation is the same as that in the second depth operation. In this case, the aperture value associated with the depth of field need not be calculated. The flow jumps to step 48. Otherwise, the flow advances to step 41.

(Step 41)

When the far object is subjected to distance measurement in the first depth operation, and the near object is subjected to distance measurement in the second depth operation, the difference X is positive. The flow advances to step 42. However, when the near object is subjected to distance measurement in the first depth operation and the far object is subjected to distance measurement in the second depth operation, the difference X is negative. In this case, the flow advances to step 43.

(Step 42)

A lens driving amount and a lens driving direction, both of which are required to move the lens from the present lens position to the intermediate position c (FIG. 1B) are calculated in accordance with $X \times 7/17$.

(Step 43)

A lens driving amount and a lens driving direction, both of which are required to move the lens from the present lens position to the intermediate position c are calculated in accordance with $X \times 10/17$.

(Step 44)

The lens driving amounts and the lens driving directions, both of which are calculated in steps 42 and 43, are output from the PP port of the microcomputer COM to cause the lens driving motor MT2 to drive the photographing lens L1 to the intermediate position c.

(Step 45)

The defocus amount d stored in step 35 is read out to calculate the aperture value Avdep associated with the depth of field as follows:

$$Avdep = d \times (7/17) \div 3.5 \mu m$$

(Step 46)

The photometric value or exposure value is fetched by the microcomputer COM.

(Step 47)

The photometric value fetched in step 46 is stored in the memory as an exposure value Ev2.

(Step 48)

The aperture value Avdep is determined as described above, and "1" is stored in the K register. The flow advances from step 19 to step 20. If zooming is performed after the aperture value Avdep is determined, the depth of field is changed due to a change in focal length The aperture value Avdep must be changed accordingly. The zooming state data (the present focal length) is input through the encoder ENC2 in step 20, and calculation $Avdep \times \{(\text{Present Focal Length})/(\text{Focal Length by Second Depth Operation})\}^2$ is performed to correct the aperture value Avdep. The calculated value is updated as the present aperture value Avdep. If the aperture value Avdep is smaller than the minimum aperture value Av1 in step 21, the display DIPS is flickered as an alarm in step 22. Since the operation for determining the aperture value Avdep has been completed and condition K=1 is established, the flow advances to step 49.

(Step 49)

The microcomputer COM detects the state of the release switch sw2. Assuming that the release switch sw2 is kept off, the flow advances to step 50 through steps 24 to 36.

(Step 50)

The microcomputer COM determines that the exposure value selection switch swEV selects the average value or the latest value.

(Step 51)

When the microcomputer COM determines that the exposure value corresponds to the latest value, the latest exposure value Ev2 obtained in the third depth operation in step 46 is stored in the Ev register. By using the latest value, exposure control can be performed to satisfy the practical applications.

(Step 52)

If the microcomputer COM determines that the exposure value corresponds to the average value, the average value between the values obtained in the first and second depth operations, i.e., $(Ev0 + Ev1)/2$, is stored in the Ev register. If a difference between the exposure values of the near and far objects is large, e.g., if the objects are white and black objects, an exposure control failure can be minimized by using the average value.

(Step 53)

The aperture value Avdep is stored in the Av register.

(Step 54)

A time value Tv is calculated in accordance with equation $Tv = Ev - Av$.

(Step 55)

The f-number corresponding to the aperture value and the shutter speed corresponding to the time value are displayed on the DIPS on the basis of the values Av and Tv (the APEX system). The operations in steps 28, 3 to 10, 38, 19 to 23, 49, 24, 36, 50, 51 or 52, 53, and 28 are repeated as far as the switch sw1 is kept on.

When the operations for determining the aperture value Avdep are not completed in the series of steps described above, condition K=0 is established. Even if the release switch sw2 is turned on, the flow jumps step 49 and advances from step 23 to step 24. The shutter release operation is inhibited up to the third depth operation. Since K=1 is established from the third depth operation, the flow advances from step 49 to step 56 upon an ON operation of the release switch sw2. Note that the flow advances to step 56 upon an ON operation of the switch SW2 after the third depth operation is performed.

(Step 56)

The timer started in step 5 is forcibly interrupted even if the time set in the timer has not yet elapsed.

(Step 57)

The microcomputer COM determines whether the charge end signal is input. If NO in step 57, the flow advances to step 58.

(Steps 58–64)

An aperture value Avdep associated with the depth of field which covers both the first and second objects is calculated in the same manner as in steps 25 and 50 to 55. A time value Tv is calculated on the basis of the aperture value Avdep. An f-number corresponding to the Avdep and a shutter speed corresponding to the time value Tv are displayed on the display DISP.

(Step 65)

The calculated aperture value Av is output from the PH port to the D/A converter DA1. The subtracter AMP2 calculates a voltage representing an aperture value difference ΔAv and supplies it to the diaphragm control circuit DRAV.

(Step 66)

The calculated time value Tv is output from the PJ port to the real time expansion circuit EXP.

(Step 67)

Figure 4:
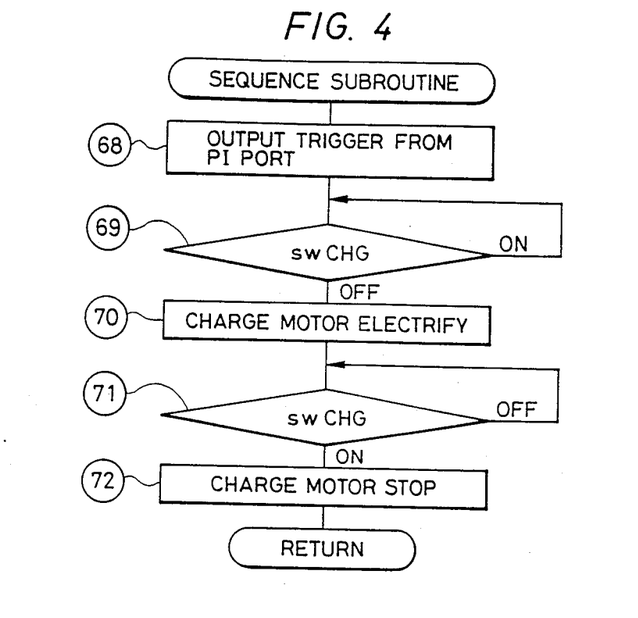

A sequence subroutine (steps 68 to 72) shown in FIG. 4 is called.

(Step 68)

A trigger signal is output from the PI port to the diaphragm control circuit DRAV and the shutter control circuit DRTV, and these circuits are operated. The diaphragm control circuit DRAV energizes the start magnet MG1 to drive an aperture control member (not shown) and the stop magnet MG2 when the diaphragm is driven by the difference ΔAv and the diaphragm control member is then stopped. Therefore, the diaphragm is so controlled as to correspond to the aperture value Avdep. The shutter control circuit DRTV is operated to drive the front curtain magnet MG3, and the front curtain starts to run. The real time expansion circuit EXP is started upon driving of the front curtain. When the real time expansion circuit EXP measures a time obtained by expanding the time value Tv, the expansion circuit EXP sends a signal to the shutter control circuit DRTV. The rear curtain magnet MG4 is operated and the rear curtains starts to run. Therefore, exposure operations are completed.

(Step 69)

When the rear curtain is stopped, the charge switch swCHG is turned off. The microcomputer COM determines that the switch swCHG is turned off.

(Step 70)

The charge motor MT1 is energized by the motor driving circuit DR1 to perform charging of the shutter and the diaphragm and film feeding.

(Step 71)

When the microcomputer COM determines that the charge switch swCHG is turned on, the end of charging is detected.

(Step 72)

The charge motor MT1 is deenergized by the motor driving circuit DR1. The flow returns to step 28.

In continuous photographing in the depth mode, the photometering switch sw1 and the release switch sw2 are kept on when the flow returns to step 28. The flow returns from step 28 to step 3 but does not return to step 2. Conditions n=2 and K=1 are maintained. The operations in steps 28, 3 to 10, 38, 19 to 23, 49, and 56 are performed. The aperture value Avdep and the exposure values Ev0, Ev1, and Ev2, which are obtained in the first release operation are maintained during continuous photographing. In this manner, I photographing conditions are kept unchanged during continuous photographing.

In addition to the case of continuous photographing, when the photometering switch sw1 is kept ON even after the release operation, the flow returns from step 28 to step 3. The aperture value Avdep and the exposure values Ev0, Ev1, and Ev2, which are obtained in the first release operation, are maintained. Even if the photometering switch sw1 is turned off after a short ON period, the flow returns from steps 28 and 31 to step 3 until the time of the timer has elapsed. The above-mentioned aperture value Avdep and the exposure values Ev0, Ev1, and Ev2 are kept unchanged due to the following reason. The photometering switch sw1 is turned on three times in the depth mode, and a long preparation time is required in this mode. The determined aperture value Avdep is utilized as much as possible.

When the time of the timer has elapsed after the photometering switch sw1 is turned off, or when the photometering switch sw1 is turned off immediately after the release operation is completed, the flow returns from step 31 to step 2, so that n=0 and K=0. The aperture value Avdep and the exposure values Ev0, Ev1, and Ev2, which are obtained in the first release operation, are no longer used in the subsequent photographing operations.

The following operation will be performed when the main capacitor in a strobe unit attached to the camera is completely charged during the depth mode and a charge end signal is input to the PD port of the microcomputer COM. In this case, the flow is branched from step 7 into step 9 to reset the n and K registers to zero. This indicates that the depth mode is canceled. When the first and second objects are separated from each other by a given distance (i.e., a distance subjected to the depth mode), optimal exposure may not be often set for the far object. The camera is automatically set in the normal mode, and the flow advances from step 9 o step 73.

Figure 5:
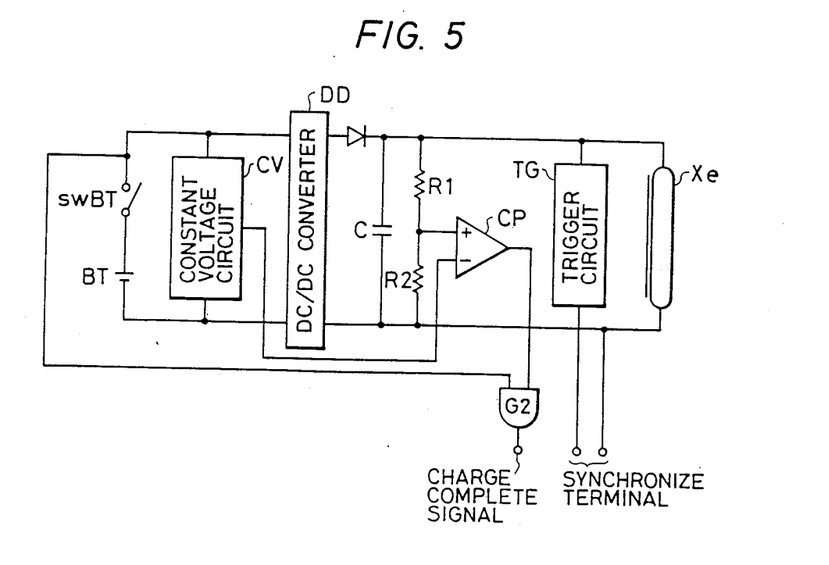
FIG. 5 is a circuit diagram of a strobe unit employed in the camera shown in FIG. 1A.

More specifically, in the strobe unit (FIG. 5) attached to the camera, the power switch swBT is turned on to charge the main capacitor in the strobe unit with an output from a DC/DC converter DD. When a comparator CP detects that the charging voltage reaches the charge end level, an AND gate G2 supplies a charge end signal of high level to the PD port of the microcomputer COM. The circuit shown in FIG. 5 also includes a battery BT, a constant voltage circuit CV for supplying a reference voltage to the comparator CP, voltage-dividing resistors R1 and R2, a trigger circuit TG, and a flash discharge tube Xe. In the depth mode, when the microcomputer COM receives the charge end signal from the strobe unit to the PD port, the flow is branched from step 7 into step 9. The n and K registers are reset to zero, and the depth operation is interrupted. In this case, the camera is set in the normal mode, and the flow advances from step 9 to step 73.

(Step 73)

The microcomputer COM fetches the exposure value Ev from the A/D converter AD1.

(Step 74)

The microcomputer COM detects the state of the AF mode selection switch swAF.

(Step 75)

When the servo mode is selected, the object is always subjected to distance measurement.

(Step 76)

When the object is moved as a result of distance measurement, the photographing lens is moved to the in-focus position accordingly.

(Step 77)

When the one-shot mode is selected, the state of the a register is detected. Condition a=1 indicates that the photographing lens is moved to the in-focus position once. In this case, the flow advances to step 49 without performing distance measurement and lens driving.

(Steps 78 and 79)

The object is subjected to distance measurement and the photographing lens is moved to the in-focus position.

(Step 80)

"1" is set in the a register. The microcomputer COM determines in step 49 if the release switch sw2 is ON. If the microcomputer COM determines that the switch sw2 is OFF, it determines in step 24 whether the charge end signal is input. If YES in step 24, the flow advances to step 81.

(Step 81)

The n and K registers are reset to zero, and the flow advances to step 82 which does not belong to the steps in the depth mode.

(Step 82)

An aperture value Av and a time value Tv are calculated in the selected AE mode on the basis of the exposure value Ev obtained in step 73. An f-number corresponding to the aperture value Av and a shutter speed corresponding to the exposure value Ev are displayed on the display DISP in step 55.

When the microcomputer COM determines in step 49 that the release switch sw2 is turned on, the flow advances to steps 56 and 57. The microcomputer COM determines in step 57 whether the charge end signal is input. If YES in step 57, the flow advances to step 83.

(Step 83)

The n and K registers are reset to zero, and the flow advances to step 84 which does not belong to the steps in the depth mode.

(Step 84)

An aperture value Av and a time value Tv are calculated in the selected AE mode on the basis of the exposure value obtained in step 73. The display operation and the release operation are performed in step 64 to 67.

In the above embodiment, when the depth mode is selected, the photographing lens is driven only once by the m register in each of the first and second depth operations. The one-shot AF mode has been automatically selected in the depth mode.

According to the present invention as described above, lens driving can be simply, automatically performed to obtain the in-focus state of the objects located at different positions.

What is claimed is:

1. An automatic focusing apparatus for a camera system, comprising:
   (a) a focus detection circuit for outputting a focus signal representing a focus state;
   (b) a driving circuit for driving a focusing optical system to an in-focus position on the basis of the focus signal from said focus detection circuit;
   (c) an operation member; and
   (d) a driving control circuit for causing said driving circuit to drive said focusing optical system (1) to a first in-focus position on the basis of the focus signal upon a first operation of said operation member, the first in-focus position being defined such that an object selected for the first operation of said operation member is set in the in-focus position, (2) to a second in-focus position on the basis of the focus signal upon a second operation of said operation member, the second in-focus position being defined such that an object selected for the second operation of said operation member is set in the in-focus position, and (3) to a position between the first and second in-focus positions upon a third operation of said operation member.

2. Apparatus according to claim 1, wherein said driving control circuit comprises a calculation circuit for calculating a value by dividing a value corresponding to the focus signal transmitted to said driving circuit upon the second operation of said operation member, and causes said driving circuit to drive said focusing optical system from the second in-focus position to the between position on the basis of the value calculated by said calculation circuit upon the third operation of said operation member.

3. Apparatus according to claim 2, wherein said calculation circuit obtains the value by dividing a difference between the first and second in-focus positions.

4. Apparatus according to claim 2, wherein said calculation circuit performs a calculation $X \times a/(a+b)$ (for $a \neq b$) for a value X corresponding to the focus signal when an in-focus position is closer to the second in-focus position than to the first in-focus position, and performs a calculation $X \times b/(a+b)$ (for $a \neq b$) for the value X when an in-focus position is closer to the first in-focus position than to the second in-focus position.

5. Apparatus according to claim 3, wherein said calculation circuit performs a calculation $X \times a/(a+b)$ (for $a \neq b$) for a difference X between the first and second in-focus positions when an in-focus position is closer to the second in-focus position than to the first in-focus position, and performs a calculation $X \times b/(a+b)$ (for $a \neq b$) for the difference X when an in-focus position is closer to the first in-focus position than to the second in-focus position.

6. Apparatus according to claim 1, further comprising an aperture value calculation circuit for calculating an aperture value on the basis of the focus signal obtained upon the second operation of said operation member, and wherein said camera performs diaphragm control on the basis of the aperture value.

7. Apparatus according to claim 1, further comprising an exposure control circuit for performing exposure upon operation of said operation member, and inhibiting mean for inhibiting start of exposure by said exposure control circuit upon operation of said operation member until said focusing optical system is completely driven to the position between the first and second in-focus positions upon a third operation of said operation member.

8. An automatic focusing apparatus for a camera system, comprising:
   (a) a focus detection circuit for outputting a focus signal representing a focus state;
   (b) a driving circuit for driving a focusing optical system to an in-focus position on the basis of the focus signal from said focus detection circuit;

(c) a driving control circuit for causing said driving circuit (1) to drive said focusing optical system to a first in-focus position for an object on the basis of a focus signal in a first state, (2) to drive said focusing optical system from the first in-focus position to a second in-focus position for an object on the basis of a focus signal from said focus detection circuit in a second state, and (3) to drive said focusing optical system to a position between the first and second in-focus positions in a third state; and (d) a manual operation member for changing a state of said driving control circuit from the first state to the second state or from the second state to the third state.

9. Apparatus according to claim 8, further comprising a photometering circuit, and wherein said camera performs exposure control on the basis of a photometering circuit first output after said focusing optical system is moved to the first in-focus position and a photometering circuit second output after said focusing optical system is moved to the second in-focus position.

10. Apparatus according to claim 10, further comprising (1) a release operation member, (2) an exposure control circuit for performing exposure upon operation of said release operation member, and (3) inhibiting means for inhibiting start of exposure by said exposure control circuit upon an operation of said release operation member until said focusing optical system is completely driven to the position between the first and second in-focus positions when said focusing optical system is driven to the first in-focus position under the control of said driving control circuit.

11. Apparatus according to claim 8, wherein the camera system has a servo mode for causing said driving circuit to repeatedly drive said focusing optical system on the basis of a focus signal from said focus detection circuit, and a one-shot mode for inhibiting driving of said focusing optical system after said focusing optical system is set in a in-focus state on the basis of the focus signal from said focus detection circuit, said apparatus further comprising selecting means for selecting one of the servo and one-shot modes, and wherein said driving control circuit comprises a control circuit unit for driving said focusing optical system in the one-shot mode even if the mode selected by said selecting means is the servo mode when said focusing optical system in the first or second state is to be driven.

12. Apparatus according to claim 11, wherein the one-shot mode inhibits driving of said focusing optical system once said focusing optical system is driven on the basis of the focus signal from said focus detection circuit.

13. A camera with an automatic focusing apparatus, comprising:

(a) a focus detection circuit for detecting a focus state;

(b) a driving circuit for driving a focusing optical system to an intermediate position between first and second in-focus positions, the first in-focus position being represented by the focus state detected by said focus detection circuit for a first object at a given time, and the second in-focus position being represented by the focus state detected by said focus detection circuit for a second object at a time different from the given time; and (c) an exposure control circuit for performing photmetric operations of the first and second objects to perform exposure control on the basis of exposure values of the first and second objects.

14. Apparatus according to claim 8, further comprising a photometering circuit, and wherein said camera performs exposure control on the basis of an output from said photometering circuit after said focusing optical system is moved to the position between the first and second in-focus positions.

15. A camera with an automatic focusing apparatus, which performs continuous photographing while a release operation member is kept depressed, comprising:

(a) a focus detection circuit for detecting a focus state so as to set an object in an in-focus position;

(b) a driving circuit for driving a focusing optical system to an intermediate position between first and second in-focus positions, the first in-focus position being represented by the focus state detected by said focus detection circuit for a first object at a given time, and the second in-focus position being represented by the focus state detected by said focus detection circuit for a second object at a time different from the given time; and (c) a photographing control circuit for causing a photographing operation to start upon depression of said release operation member, and for causing the photographing operation to repeat while said release operation member is kept depressed, said photographing control circuit being adapted to repeat the photographing operation while said focusing optical system is in the intermediate position during the repeated photographing operation when said focus detection circuit and said driving circuit control movement of said focusing optical system to the intermediate position between the first and second position prior to start of a first photographing operation.

16. A camera according to claim 15, further comprising an aperture value calculation circuit for calculating an aperture value for causing the first and second in-focus positions to fall within a depth of field when the focusing optical system is moved to the intermediate position, and a diaphragm control circuit for controlling a diaphragm on the basis of the aperture value calculated by said aperture value calculation circuit in the first photographing operation and for maintaining the aperture value obtained for the first photographing operation in the subsequent photographing operation.

17. A camera with an automatic focusing apparatus and capable of being coupled to a flash unit, comprising:

(a) a focus detection circuit for detecting a focus state;

(b) a control circuit having (1) a first mode for driving a focusing optical system to an intermediate position between a first in-focus position for a first object and a second in-focus position for a second object in accordance with the focus state detected by said focus detection circuit, and (2) a second mode for driving said focusing optical system in accordance with the focus state detected by said focus detection circuit;

(c) setting means for setting one of the first and second modes; and (d) inhibiting means for inhibiting control of said control circuit in the first mode when the flash unit is used.

18. A camera according to claim 17, wherein the flash unit has (1) a capacitor for accumulating energy discharged by a flash tube, and (2) charge end signal generating means for generating a charge end signal when said capacitor is charged to a level equal to or higher than a predetermined level, and wherein said control circuit comprises switching means for switching said control circuit from the first mode to the second mode in response to the charge end signal.

19. Automatic focusing apparatus, comprising:
(a) a focus detection circuit for detecting a focus state;
(b) a driving sequence control circuit for sequentially driving a focusing optical system to a first in-focus position for a first object on the basis of a focus detection result of said focus detection circuit to the first object, to a second in-focus position for a second object on the basis of a focus detection result of said focus detection circuit to the second object, and to an intermediate position between the first and second in-focus positions from the second in-focus position; and
(c) an intermediate position control circuit for driving the focusing optical system to the intermediate position which is apart from the second in-focus position by $X \times a/(a+b)$ (where $a \neq b$, and X is the difference between the first and second positions) when said second object is nearer than said first object, and to an intermediate position apart from said second in-focus position by $X \times b/(a+b)$ (where $a \neq b$, and X is the difference between the first and second positions) when the first object is nearer than said second object.

20. A camera with an automatic focusing apparatus, comprising:
(a) a focus detection circuit for detecting a focus state;
(b) a driving circuit for driving a focusing optical system to an intermediate position between first and second in-focus positions, the first in-focus position being represented by the focus stat detected by said focus detection circuit for a first object, and the second in-focus position being represented by the focus state detected by said focus detection circuit for a second object; and
(c) an exposure control circuit for performing photometric operations for the first and second objects, and for performing exposure control on the basis of exposure values of the first and second objects.

21. A camera with an automatic focusing apparatus, comprising:
(a) a focus detection circuit for detecting a focusing state;
(b) a driving sequence control circuit which sequentially drives a focusing optical system to a first in-focus position for a first object on the basis of a focus detection result of said focus detection circuit to the first object, to a second in-focus position of or a second object on the basis of a focus detection result of said focus detection circuit to the second object, and to an intermediate position between the first and second in-focus positions from the second in-focus position; and
(c) an exposure control circuit for controlling an exposure amount on the basis of (1) a first photometering value when said focusing optical system is driven tot he first in-focus position, and (2) a second photometering value when said focusing optical system is driving to the second in-focus position.

22. A camera with an automatic focusing apparatus, comprising:
(a) a focus detection circuit for detecting a focusing state;
(b) a driving sequence control circuit which sequentially drives a focusing optical system to a first in-focus position for a first object on the basis of a focus detection result of said focus detection circuit to the first object, to a second in-focus position for a second object on the basis of a focus detection result of said focus detection circuit to the second object, and to an intermediate position between the first and second in-focus positions from the second in-focus position;
(c) a release operation member for starting an exposure; and
(d) prohibiting means for prohibiting the exposure started by operation of said release operation member if it is operated before said focusing optical system reaches the intermediate position.

23. A camera with an automatic focusing apparatus, which performs continuous photographing while a release operation member is kept depressed, comprising:
(a) a focus detection circuit for detecting a focus state;
(b) a driving circuit for driving a focusing optical system to an intermediate position between first and second in-focus positions, the first in-focus position being represented by the focus state detected by said focus detection circuit for a first object, and the second in-focus position being represented by the focus state detected by said focus detection circuit for a second object; and
(c) a photographing control circuit for starting a photographing operation upon depression of the release operating member, and for repeating photographing operation while the release operation member is kept depressed said photographing control circuit being adapted to repeat the photographing operation while said focusing optical system is held in the intermediate position during the repeated photographing operation.

* * * * *

UNITED STATES PATENT AND TRADEMARK OFFICE
CERTIFICATE OF CORRECTION

PATENT NO. : 4,982,217

DATED : January 1, 1991

INVENTOR(S) : Yoshihiko AIHARA

It is certified that error appears in the above-identified patent and that said Letters Patent is hereby corrected as shown below: ON TITLE PAGE:

<u>AT 56 REFERENCES CITED:</u>

"4,639,110 7/1987 Rinn et al.." should read --4,639,110 1/1987 Rinn et al.--

<u>AT 57 ABSTRACT:</u>

"includes." should read --includes--; and "The" (first occurrence) should be deleted.

<u>COLUMN 1:</u>

Line 24, "experiences" should read --experience--.

<u>COLUMN 2:</u>

Line 38, "ca" should read --camera--; and

Line 40, "ment the" should read --ment of the camera--.

<u>COLUMN 3:</u>

Line 15, "observes'" should read --observes--; and

Line 35, "thrid" should read --third--.

<u>COLUMN 5:</u>

Line 64, "zeto." should read --zero.--.

UNITED STATES PATENT AND TRADEMARK OFFICE
CERTIFICATE OF CORRECTION

PATENT NO. : 4,982,217

DATED : January 1, 1991

INVENTOR(S) : Yoshihiko AIHARA

It is certified that error appears in the above-identified patent and that said Letters Patent is hereby corrected as shown below:

COLUMN 7:

Line 13, "exposure value Ev" should read --The exposure value Ev--.

COLUMN 8:

Line 39, "step 2." should read --step 12.--.

COLUMN 10:

Line 9, "length" should read --length.--.

COLUMN 12:

Line 45, "o" should read --to--.

COLUMN 14:

Line 31, "xXa/(a+b)" should read --Xxa/(a+b)--; and

Line 56, "mean" should read --means--.

COLUMN 15:

Line 22, "claim 10," should read --claim 8,--; and

Line 40, "a" should read --an--.

UNITED STATES PATENT AND TRADEMARK OFFICE
CERTIFICATE OF CORRECTION

PATENT NO. : 4,982,217

DATED : January 1, 1991

INVENTOR(S) : Yoshihiko AIHARA

It is certified that error appears in the above-identified patent and that said Letters Patent is hereby corrected as shown below:

COLUMN 17:

Line 38, "focus stat" should read --focus state--; and

Line 55, "of" should be deleted.

COLUMN 18:

Line 1, "or" should read --for--;

Line 9, "tot he" should read --to the--; and

Line 11, "driving" should read --driven--.

SHEET 1, FIGURE 1A:

"PHOTOMETRING" should read --PHOTOMETERING--.

UNITED STATES PATENT AND TRADEMARK OFFICE
CERTIFICATE OF CORRECTION

PATENT NO. : 4,982,217                    Page  4  of  4

DATED       : January 1, 1991

INVENTOR(S) : Yoshihiko AIHARA

It is certified that error appears in the above-identified patent and that said Letters Patent is hereby corrected as shown below:

SHEET 3, FIGURE 3A:

"PHOTOMETRING" should read --PHOTOMETERING--
       (all occasions).

SHEET 4, FIG. 3B

"PHOTOMETRING" should read --PHOTOMETERING--.

Signed and Sealed this

Twenty-ninth Day of September, 1992

Attest:

DOUGLAS B. COMER

Attesting Officer     Acting Commissioner of Patents and Trademarks